(12) United States Patent
Kobayashi et al.

(10) Patent No.: US 8,463,162 B2
(45) Date of Patent: Jun. 11, 2013

(54) IMAGE FORMING APPARATUS

(75) Inventors: Yuji Kobayashi, Toyohashi (JP);
Hiroyuki Yoshikawa, Toyohashi (JP);
Teruhiko Fujikura, Toyokawa (JP);
Munehiro Natsume, Toyokawa (JP);
Mutsuto Oe, Toyokawa (JP); Katsuyuki Ikuta, Hino (JP); Yasushi Hieno, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 297 days.

(21) Appl. No.: 12/937,690

(22) PCT Filed: Aug. 19, 2009

(86) PCT No.: PCT/JP2009/003952
§ 371 (c)(1),
(2), (4) Date: Oct. 13, 2010

(87) PCT Pub. No.: WO2010/026706
PCT Pub. Date: Mar. 11, 2010

(65) Prior Publication Data
US 2011/0038652 A1 Feb. 17, 2011

(30) Foreign Application Priority Data
Sep. 4, 2008 (JP) .................................. 2008-226710

(51) Int. Cl.
*G03G 15/00* (2006.01)

(52) U.S. Cl.
USPC ........................................................ 399/167

(58) Field of Classification Search
USPC ................................................. 399/167, 397
See application file for complete search history.

(56) References Cited

U.S. PATENT DOCUMENTS
2009/0080917 A1* 3/2009 Kinokuni ......................... 399/44

FOREIGN PATENT DOCUMENTS

| JP | 6-75500 | 3/1994 |
|---|---|---|
| JP | 6-80273 | 3/1994 |
| JP | 7-104546 | 4/1995 |
| JP | 7-140739 | 6/1995 |
| JP | 2000-235293 | 8/2000 |
| JP | 2001-106380 | 4/2001 |
| JP | 2003-276266 | 9/2003 |
| JP | 2005-138928 | 6/2005 |
| JP | 2005-248982 | 9/2005 |

OTHER PUBLICATIONS

Machine translation of JP 06-080273.*
Machine translation of JP 2001-106380.*

(Continued)

*Primary Examiner* — Walter L Lindsay, Jr.
*Assistant Examiner* — Barnabas Fekete
(74) *Attorney, Agent, or Firm* — Morrison & Foerster LLP

(57) ABSTRACT

The present invention is capable of changing the system speed quickly and highly accurately while using a CVT device with an advantage in its quietness to transmit a driving force to rotative parts.

Specifically, in the case of using a sheet of thick paper as a recording sheet, the controller changes, for each of the pulleys, the distance between the pulley segments (S204) while starting up the DC motor as the driving source (S202). After that, the controller performs the feedback control on the rotation of the DC motor, based on a detection signal received from the encoder of the load shaft of the driven pulley, to achieve the target rotation speed of the load shaft (S206: NO, S207).

9 Claims, 14 Drawing Sheets

OTHER PUBLICATIONS

International Search Report mailed on Oct. 13, 2009, directed to counterpart International Patent Application No. PCT/JP2009/003952; 2 pages.

Notification of Reasons for Refusal mailed on Oct. 6, 2009, directed to counterpart Japanese Patent Application No. 2008-226710; 7 pages.

Notification of Reasons for Refusal mailed on Apr. 13, 2010, directed to counterpart Japanese Patent Application No. 2008-226710; 10 pages.

Japanese Office Action mailed on Sep. 21, 2010 directed to Japanese Application No. 2008-226710; (7 pages).

* cited by examiner

Case of plain paper

Case of heavy paper

FIG. 12

Initial value table T1

| Sheet type | Transmission ratio of CVT device | Drive pulse count of stepping motor | Initial target speed of DC motor (rpm) | Target speed of load shaft (rpm) |
|---|---|---|---|---|
| Plain paper | a1 | 0 | b1 | c1 |
| Heavy paper · OHP | a1/2 | k | b2 | c1/2 |

FIG. 13

Table T2 for correction of target rotation speed of motor

| Rotation speed error of load shaft (%) | Correction amount of target rotation speed of motor (%) |
|---|---|
| +1.5 | −d15 |
| . | . |
| . | . |
| . | . |
| . | . |
| +0.2 | −d2 |
| +0.1 | −d1 |
| 0 | 0 |
| −0.1 | +u1 |
| −0.2 | +u2 |
| . | . |
| . | . |
| . | . |
| . | . |
| −1.5 | +u15 |

US 8,463,162 B2

IMAGE FORMING APPARATUS

REFERENCE TO RELATED APPLICATIONS

This application is a national stage application under 35 USC 371 of International Application No. PCT/JP2009/003952, filed Aug. 19, 2009, which claims the priority of Japanese Application No. 2008-226710, filed Sep. 4, 2008, the contents of which prior applications are incorporated herein by reference.

FIELD OF THE INVENTION

The present invention relates to a technology to drive rotative parts of an image forming apparatus to rotate. The rotative parts include, for example, a rotative image carrier such as a photoreceptor drum, and a roller such as a sheet conveyance roller. The present invention particularly relates to a technology to change the rotation speeds of such rotative parts.

BACKGROUND OF THE INVENTION

An image forming apparatus, such as a printer and a photocopying machine, includes many rotative parts, such as a sheet conveyance roller and a photoreceptor drum. Stable driving of such rotative parts leads to smooth image formation operations, which results in favorable output images.

Generally, in such an image forming apparatus, the maximum capability of a heating means such as a heater, included in a fixing device thereof, is beforehand determined on the premise of the use of sheets of plain paper. Thus, in the case of forming an image on a sheet of special paper such as thick paper and an OHP sheet, under heating might be caused due to high thermal capacity of the paper. This can be a cause of a fixing failure.

To avoid this problem, a heater or the like with a high heating capability can be adopted in the fixing device. However, such a heater increases the power consumption contrary to the trend toward the energy saving, and inevitably increases the cost of the fixing device as well.

In view of the above, conventional technologies avoid a fixing failure by reducing the system speed without changing the heating capability of the heater and so on of the fixing device, to reduce the amount of heat taken away by the sheet per unit time.

In the case of performing such a system speed change, gears are generally used as a mechanism for transmitting power from the motor to each of the rotative parts. The system speed is changed by changing the gear ratio.

However, it is problematic that gears generate a relatively loud noise, which is annoying especially in a quiet office.

In view of this problem, a CVT (Continuously Variable Transmission) device using a belt drive is considered to be introduced as a speed changer for an image forming device.

According to this idea, each of the pulleys of the CVT device is divided into two segments in the middle of the axis of the pulley, and the V-shaped groove in the lateral surface of each pulley is configured such that the distance between the respective groove slopes of the divided segments is variable. This structure realizes smooth change of the ratio between the diameters of the pulleys, and thereby realizes smooth speed change. Such a structure provides comfortable office environment, because it does not generate gear noise.

LIST OF PRIOR ART

Japanese Patent Application Publication No. 6-75500
Japanese Patent Application Publication No. 7-140739

SUMMARY OF THE INVENTION

However, although the CVT device described above has an advantage in its quietness, it can not realize high responsivity and high control accuracy.

The response speed of a CVT device is low. Also, the control accuracy of a CVT device is not high enough and thus large errors might occur. This is because, when changing the speed, a CVT device mechanically changes the distance of the gap between divided two portions of the pulley, between which a V-shaped belt is suspended (the portions are hereinafter called "pulley segments").

Particularly in color image forming apparatuses, it is demanded that the error of the system speed of rotative parts, such as the photoreceptor drum and the sheet conveyance roller, is in the range of plus or minus 0.1%, in order to realize preferable image quality. However, in the case of the speed change with the CVT device, the rotative parts require a long time to reach the desired system speed, even under the feedback control. In addition, it is impossible to secure the required accuracy.

This results in delay in starting execution of an image forming job that requires changes of the system speed according to, for example, the type of a recording sheet. Also, the image quality will be degraded.

The present invention has been achieved in view of the problems described above. An aim of the present invention is to provide an image forming apparatus that uses a belt-drive speed changer and is capable of changing the system speed quickly and highly accurately while keeping its quietness.

In order to solve the above problems, one aspect of the present invention is an image forming apparatus comprising: a driver unit utilizing a motor as a driving source and operable to rotate a load shaft connected with at least one of a sheet conveyance roller and a rotative image carrier; and a controller operable to control the driver unit to regulate a rotation speed of the load shaft, wherein the driver unit includes a variable speed transmission unit for transmitting a driving force and changing a transmission ratio between the motor and the load shaft, the variable speed transmission unit includes: a pair of pulleys each having a groove in a circumferential surface thereof and each divided into a pair of pulley segments in the middle of an axis thereof; a V-shaped belt suspended between the grooves of the pair of pulleys; and a distance changer unit changing, for each pair of pulley segments, a distance between the pair of pulley segments, to change the transmission ratio, and the controller is configured to perform: a first control for controlling the variable speed transmission unit to cause the distance changer unit to change the transmission ratio to a predetermined ratio; and a second control for detecting the rotation speed of the load shaft after completion of the first control, and changing a rotation speed of the motor by feedback control, to change the rotation speed of the load shaft to a target rotation speed.

In the stated structure, the variable speed transmission unit, which uses the divided pulley segments and the V-shaped belt, is provided in a driving force transmission path from the driving source to the load shaft. Thus, the structure does not generate noise to acquire quietness. Moreover, after the variable speed transmission unit changes the transmission ratio (i.e. the first control), the feedback control is performed to adjust the rotation speed of the motor, based on the detected value of the rotation speed of the load shaft (i.e. the second control). Thus, the structure enables more quick and accurate change of the system speed than the case of changing the system speed only with the variable speed transmission unit.

BRIEF DESCRIPTION OF THE DRAWINGS

FIG. 2A shows the case of using sheets of plain paper, and FIG. 2B shows the case of using sheets of thick paper.

FIG. 12 is an example of an initial value table.

FIG. 13 is an example of a table used for correction of a target rotation speed of the motor.

FIG. 14A is a partially cutaway view of a driven pulley. FIG. 14B shows a ring-shaped electrode provided on a flange part.

DETAILED DESCRIPTION OF THE INVENTION

The following describes an embodiment of the image forming apparatus pertaining to the present invention, based on a digital full-color photocopying machine (hereinafter simply called "a photocopying machine") as an example of the image forming apparatus.

(1) Structure of Photocopying Machine

Figure 1:
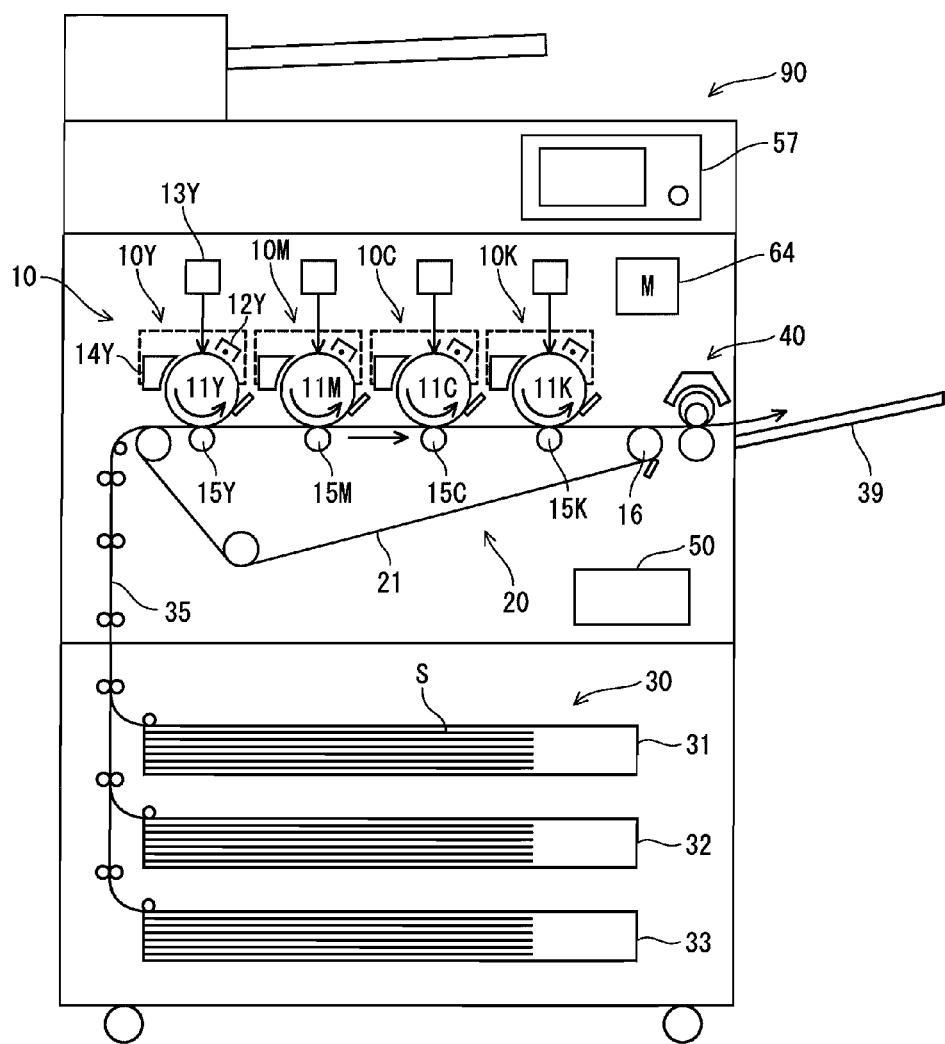
FIG. 1 schematically shows the structure of a photocopying machine pertaining to an embodiment of the present invention.

FIG. 1 schematically shows an overall structure of the photocopying machine pertaining to this embodiment of the present invention.

As FIG. 1 shows, a photocopying machine 1 forms images by using a known electrophotographic technology. The photocopying machine 1 includes an image processor 10, a belt conveyer 20, a paper feeder 30, a fixing device 40, a controller 50, and an image reader 90.

The image processor 10 is provided with imaging units 10Y to 10K, which correspond to colors yellow (Y), magenta (M), cyan (C) and black (K), respectively. The imaging unit 10Y includes a photoreceptor drum 11Y, and a charger 12Y, an exposure part 13Y, a developer 14Y, a transfer roller 15Y and a cleaner 16Y disposed surrounding the photoreceptor drum 11Y. The cleaner 16Y is for cleaning the photoreceptor drum 11Y. The imaging unit 10Y generates a Y-color image on the photoreceptor drum 11Y, through known processes of charging, exposing and developing. The imaging units 10M, 10C and 10K have the same structure as the imaging unit 10Y, and generate images in their respective colors, on the photoreceptor drum 11M to 11K, respectively.

The paper feeder 30 includes three paper cassettes 31, 32 and 33. The paper feeder 30 pulls out a sheet S one by one from the paper cassette designated by the user, and feeds the sheet to the belt conveyer 20 via a conveyance path 35.

The belt conveyer 20 includes a conveyance belt 21 that is driven to rotate in the direction indicated by the arrow in the drawing. The belt conveyer 20 conveys the sheet S, which is provided from the paper feeder 30 and is in close contact with the conveyance belt 21, to the transfer positions of the photoreceptor drums 11Y to 11K, sequentially. While the sheet S passes through the transfer positions, the toner images on the photoreceptor drums 11Y to 11K are transferred in the form of a multilayer onto the sheet S. Thus a full-color toner image is formed on the sheet S. The transfer is realized by the effect of electrostatic force by the electric field generated between the transfer rollers 15Y to 15K and the photoreceptor drums 11Y to 11K. After the transfer, heat and pressure is applied to the sheet S, so that the toner image on the sheet is fixed. Then, the sheet S is ejected onto a sheet receiving tray 39.

The controller 50 generates digital image signals for reproducing Y, M, C and K colors, based on image data acquired from the image reader 90 which has been caused to read the image from a document, or image data for a print job, received from an external terminal device (not illustrated), via a network (e.g. LAN). The controller 50 also controls each of the components as explained above to realize smooth image forming operations.

On the front side of the image reader 90, an operation panel 57 is provided. The operation panel 57 is provided at such a position that users can easily operate it. The operation panel 57 accepts inputs from the user and displays predetermined messages to the user, for example.

The reference number 64 denotes a DC motor. The DC motor 64 drives a drive roller 16 of the belt conveyer 20 and the photoreceptor drums 11 to rotate at predetermined speeds, via a CVT device 60, which is described next. In this embodiment, a brushless DC motor having an advantage in the durability is used. However, the present invention is not limited to this.

(2) Structure of CVT Device 60

Figure 2A:
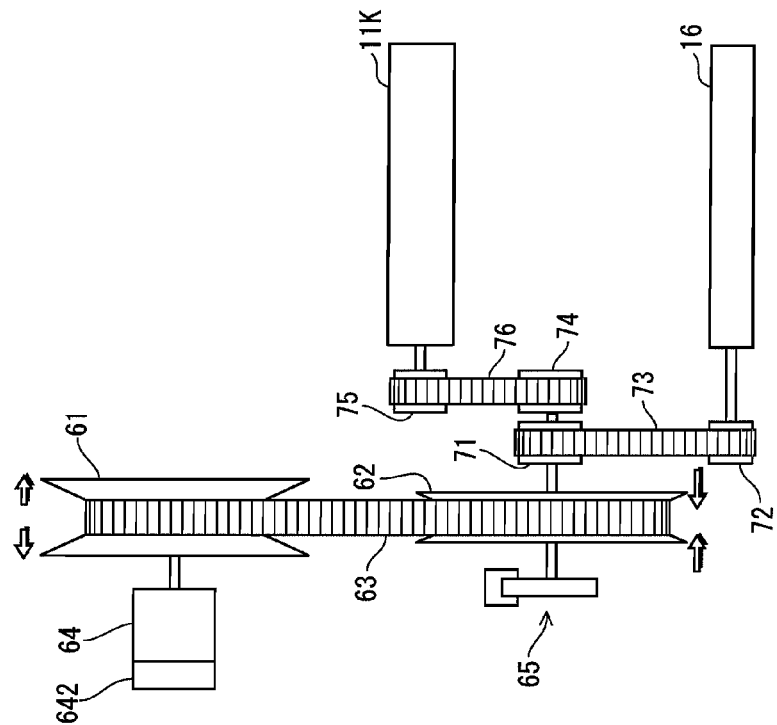
FIGS. 2A and 2B are diagrams for explaining basic operations of a CVT device for changing the system speed adopted in the photocopying machine.
Figure 2B:
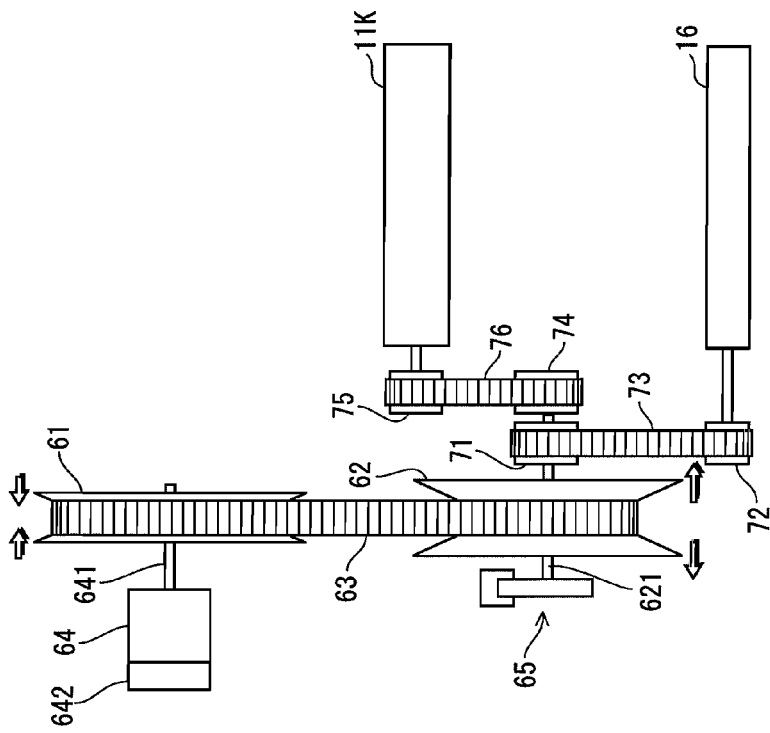

FIGS. 2A and 2B schematically show the structure of the CVT device 60. FIG. 2A shows movement of the pulley segments of a drive pulley 61 and a driven pulley 62, which get away from or close to each other, in the case where a sheet of plain paper is used and the driving is performed at a system speed V1. FIG. 2B shows movement of the pulley segments of the drive pulley 61 and the driven pulley 62 in the case where the drive speed is reduced to a system speed V2 as a sheet of thick paper is used. Hereinafter, the distance of the gap between the pulley segments of each of the drive pulley 61 and the driven pulley 62 is simply called "a pulley gap distance". Note that FIG. 2A and FIG. 2B do not show shaft bearings for the shafts, for simplification of the drawings (This also applies to FIG. 3 and FIG. 14).

As shown in FIGS. 2A and 2B, the CVT device 60 includes a drive pulley 61, a driven pulley 62, a V-shaped belt 63, and so on. The drive pulley 61 is driven to rotate by the DC motor 64. The V-shaped belt 63 is suspended between a V-shaped groove of the drive pulley 61 and a V-shaped groove of the driven pulley 62.

The driving force of the DC motor 64, transmitted from the drive pulley 61 to the driven pulley 62 via the V-shaped belt 63, is further transmitted to the photoreceptor drum 11K and the drive roller 16 via timing pulleys 71 and 74, timing belts 73 and 76 and timing pulleys 72 and 75, and rotates the photoreceptor drum 11K and the drive roller 16. The timing pulleys 71 and 74 are attached to a load shaft 621.

In this regard, the ratio between the diameters of the timing pulley 71 and 72 and the ratio between the diameters of the timing pulley 74 and 75 are determined such that the circumference speed (i.e., the running speed of the circumference surface) of the photoreceptor drum 11K is the same as the running speed of the sheet conveyance surface of the conveyance belt 21.

In this example, the DC motor 64 drives only the photoreceptor drum 11K and the drive roller 16. However, the DC motor 64 may additionally drive other rollers, such as photoreceptor drums 11Y to 11C via timing pulleys and timing belts.

The DC motor 64 is provided with an encoder 642 for detecting the rotation speed of the DC motor 64. Also, the rotation shaft (i.e. hereinafter called "the load shaft") 621 of the driven pulley 62 is provided with an encoder 65 for detecting the rotation speed of the load shaft 621.

Each of the encoders 642 and 65 may be an optical encoder or a magnetic encoder.

As FIG. 2A shows, when a sheet of plain paper is used, the pulley gap distance of the drive pulley 61 is decreased and the pulley gap distance of the driven pulley 62 is increased, such that the system speed will be V1. As FIG. 2B shows, when a sheet of thick paper is used, the pulley gap distance of the drive pulley 61 is increased and the pulley gap distance of the driven pulley 62 is decreased, such that the system speed will be V2, which is less than V1.

Here, a sheet of plain paper means a normal transfer sheet. In this description of the embodiment, it is assumed that a sheet of plain paper is a transfer sheet having a basis weight of no greater than approximately 90 g/m$^2$, and a sheet of thick paper is a transfer sheet having a basis weight greater than that. Also, the system speed for an OHP sheet in the form of a film is similar to the system speed for the sheet of thick paper.

Figure 3:
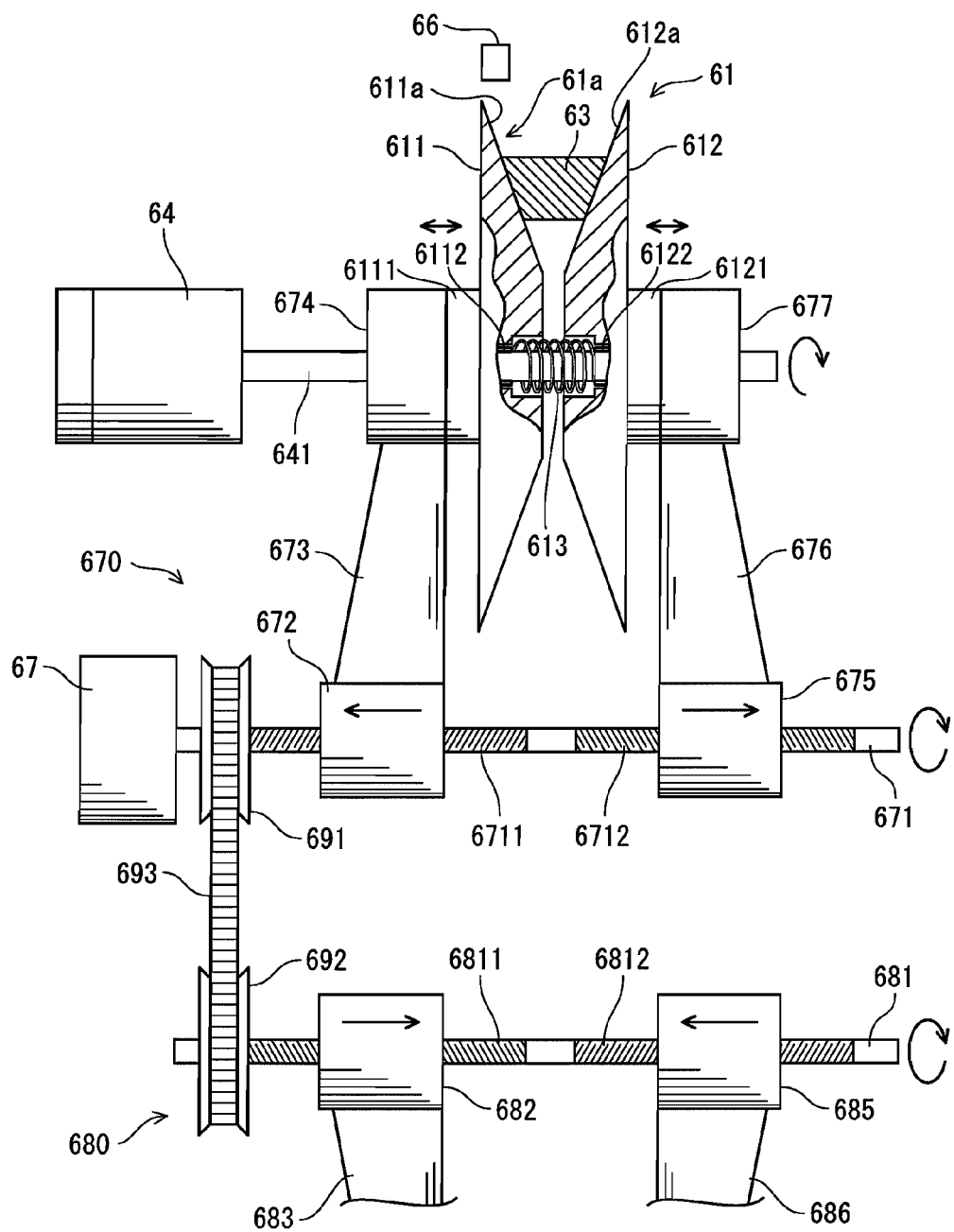
FIG. 3 is a partially cutaway view showing an example of a gap-distance adjustment mechanism for adjusting the distance between the pulley segments in the CVT device.

FIG. 3 shows the drive pulley 61 in FIG. 2A and the components surrounding it, which include the gap-distance adjustment mechanism for adjusting the pulley gap distance of the drive pulley 61. In FIG. 3, the drive pulley 61 is partially cutaway to clearly show the inside structure. Also, regarding the V-shaped belt, FIG. 3 shows only a cross section of the V-shaped belt, to clearly show the engagement with slopes 611a and 612a of a V-shaped groove 61a of the drive pulley 61.

As FIG. 3 shows, the drive pulley 61 is composed of pulley segments 611 and 612. Each of the pulley segments 611 and 612 is movable along the drive shaft 641 of the DC motor 64, and rotates together with the drive shaft 641 as regulated by keys 6112 and 6122. A compression spring 613 is provided around the part of the shaft between the pulley segments 611 and 612. The compression spring 613 biases the pulley segments 611 and 612 in the direction of separating them from each other. Also, boss sections 6111 and 6121 are provided on the outside of the pulley segment 611 and the outside of the pulley segment 612, respectively.

A gap-distance adjustment mechanism 670 for adjusting the distance between the pulley segments 611 and 612 is provided below the drive pulley 61. The gap-distance adjustment mechanism 670 is structured as follows. A shaft part extended from a drive shaft 671 of a stepping motor 67 is provided with threaded parts 6711 and 6712, and nuts 672 and 675 are screwed and fit to the threaded parts 6711 and 6712. The threaded parts 6711 and 6712 have the same pitch, and configured to rotate in the opposite directions.

The nuts 672 and 675 are integrated with arms 673 and 676, respectively. The edges of the arms 673 and 676 are connected to cylindrical pressers 674 and 677, respectively. The cylindrical pressers 674 and 677 are loosely fitted around the drive shaft 641 of the DC motor 64.

In accordance with the rotation of the stepping motor 67, the nuts 672 and 675 moves close to or away from each other by the same distance. Accordingly, the distance between the pulley segments 611 and 612 changes and the width of the V-shaped groove 61a changes. As a result, the distance from the rotation center of the drive pulley 61 to the engagement point of the V-shaped groove 61a with the V-shaped belt changes. Such a change produces the same effect as an actual change of the diameter of the pulley.

The structure of the driven pulley 62 and a gap-distance adjustment mechanism 680 therefor is basically the same as the drive pulley 61 and the gap-distance adjustment mechanism 670 therefor. However, threaded parts 6811 and 6812 provided around a rotation shaft 681 have the same pitch as the threaded parts 6711 and 6712 respectively, and are configured to spiral toward the opposite direction as the threaded parts 6711 and 6712 respectively. As a result, the pulley segments of the driven pulley 62 moves in the opposite direction of the movement of that of the drive pulley 61, by the same distance.

The driving force of the stepping motor 67 included in the gap-distance adjustment mechanism 670 is transmitted to the rotation shaft 681 of the gap-distance adjustment mechanism 680 via the timing pulleys 691 and 692 having the same diameter and the timing belt 693. Thus, the gap-distance adjustment mechanism 670 changes the distance between the pulley segments of the driven pulley 62 via the nut 682 and the arm 683, the nut 685 and the arm 686, and so on.

As a result, the pulley segments of each of the drive pulley 61 and the driven pulley 62 move in the opposite directions by the same distance, and their center points viewed in the shaft direction are always the same. Thus, this structure realizes sequential change of the transmission ratio while keeping the V-shaped belt 63 from sagging.

Note that the reference number 66 denotes a home position sensor for detecting that the pulley segment 611 is at its home position. For example, a reflective photoelectric sensor can be used as the home position sensor 66.

Usually, sheets of plain paper are used as recording sheets. Thus, the position of the pulley segment 611 for achieving the system speed for sheets of plain paper is set as the home position.

According to the embodiment described above, all the pulley segments move in conjunction with each other by the same distance. Thus, to detect the positions of the drive pulley 61 and the driven pulley 62, it is only necessary to detect the position of one of the pulley segments.

However, in the case the gap-distance adjustment mechanisms 670 and 680 are configured to be driven by different driving sources, it is preferable to additionally provide a photoelectric sensor for detecting the home position of the other pulley, namely the driven pulley 62.

(3) Structure of Controller 50

Figure 4:
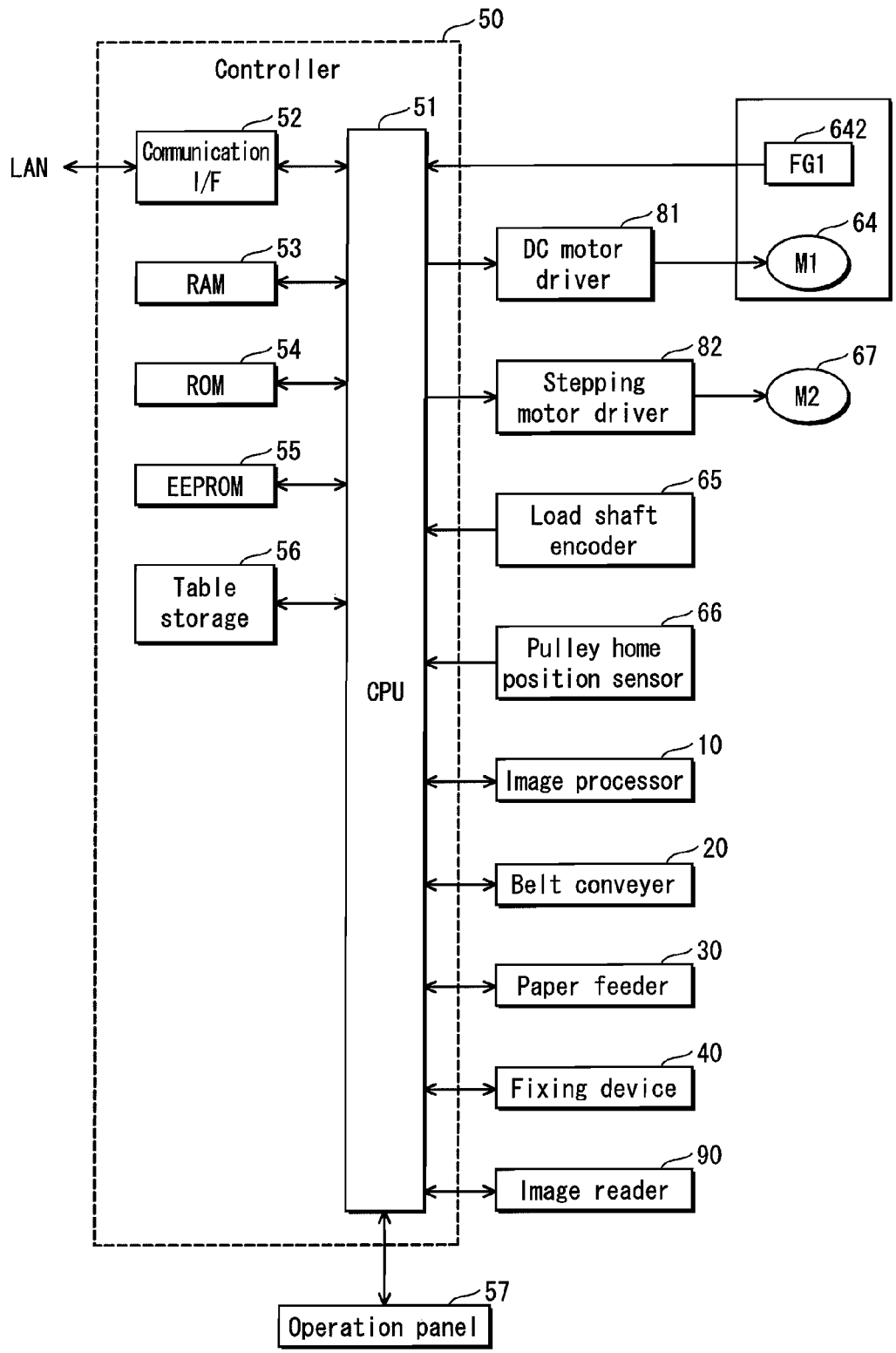
FIG. 4 is a block diagram showing a controller of the photocopying machine.

FIG. 4 is a block diagram showing the structure of the controller 50 included in the photocopying machine 1.

As FIG. 4 shows, the controller 50 includes a CPU 51, a communication I/F (interface) 52, a RAM 53, a ROM 54, an EEPROM 55, and a table storage 56.

The CPU 51 performs processing for generating digital image signals for Y, M, C and K colors, based on acquired image data. In addition, the CPU 51 reads necessary programs from the ROM 54, controls operations of each of the components at appropriate timings in an integrated manner, enables smooth document reading operations and image forming operations, and changes the system speed according to the type of the recording sheet.

The communication I/F 52 is, for example, a LAN card or a LAN board, used for connecting the CPU 51 with the LAN. The communication I/F 52 receives data of print jobs from client terminals and sends the data to the CPU 51.

The RAM 53 is a volatile memory, and is used as a work area for the CPU 51 executing programs.

The ROM 54 stores, for example, a program for controlling the operations of the above-described components included in the photocopying machine 1, and a program for switching the system speed, which is described later.

The EEPROM 55 is a non-volatile memory, and stores data showing types of the recording sheets housed in the paper cassettes.

The table storage 56 is a non-volatile memory, and stores, for example, an initial value table T1 (See FIG. 12) that the CPU 51 refers to when performing the system speed control, and a table T2 for correction of a target rotation speed of the motor (See FIG. 13).

As a matter of course, a storage area for storing the tables T1 and T2 may be prepared in the EEPROM 55 or the ROM 54.

A DC motor driver 81 receives a control signal from the CPU 51 and drives the DC motor 64, and rotates the drive pulley 61 of the CVT device 60 at a predetermined rotation speed.

A stepping motor driver 82 receives a control signal from the CPU 51 and drives the stepping motor 67, and changes the pulley gap distance of the drive pulley 61 and the driven pulley 62 of the CVT device 60.

Practically, the photocopying machine 1 further includes other variable-speed rotation drivers for driving motors other than the DC motor 64 (e.g., rotation drivers for the photoreceptor drums 11Y to 11C). However, they can be controlled in the same manner as the DC motor 64 and the stepping motor 67. Thus, they are not illustrated or explained in this Description.

The operation panel 57 is provided with hard keys, such as a numerical key pad used for inputting the number of copies, and a start key. Also, the operation panel 57 is provided with a display unit which includes an LCD display panel having a touch panel disposed on its surface. Under control of the control unit 50, the operation panel 57 displays predetermined messages and various setting screens to the user. The setting screens allow the user to input predetermined information by pressing the tabs and the buttons displayed on the screen.

Figure 5A:
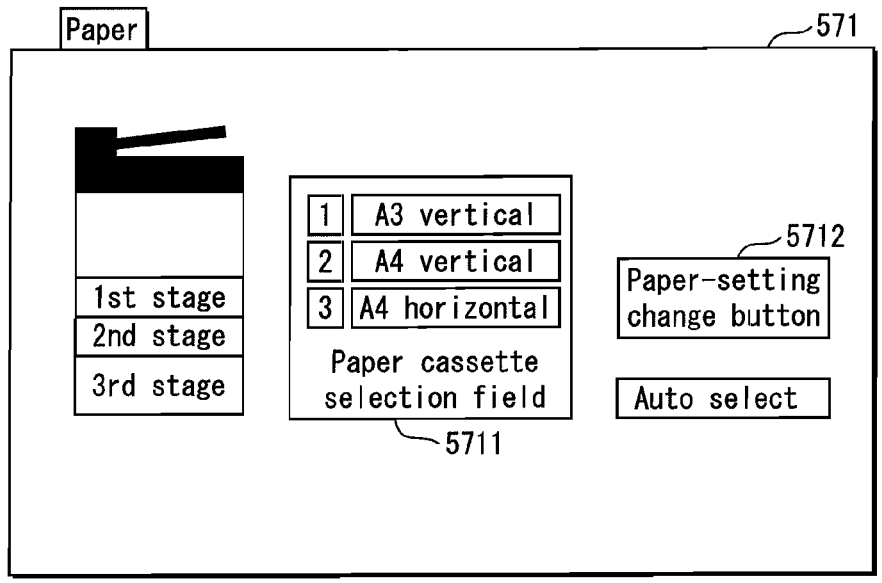
FIG. 5A is a configuration screen that is shown on a display unit of an operation panel and allows a user to select a paper tray.
Figure 5B:
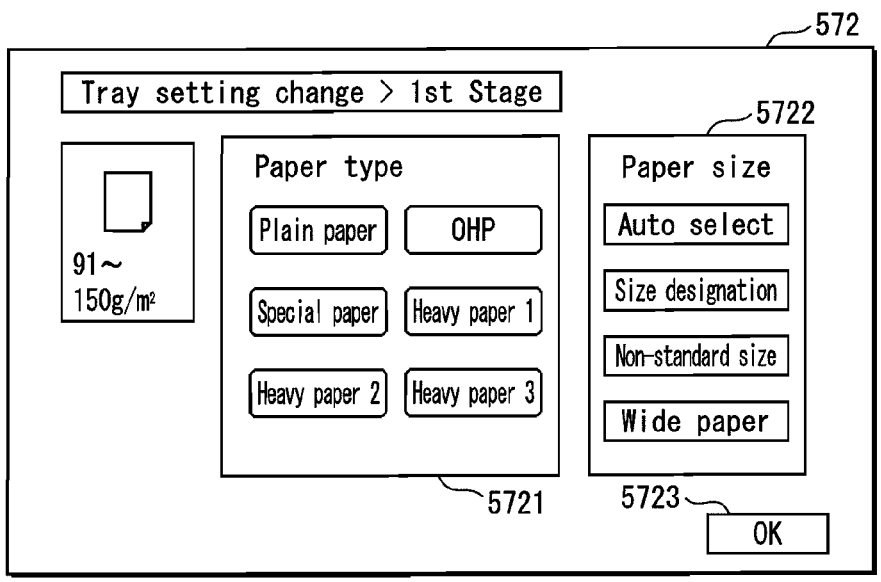
FIG. 5B is a configuration screen that is shown when the user presses a paper-setting change button for the selected tray.

FIGS. 5A and 5B show example configuration screens to be displayed on the display unit of the operation panel 57, used for setting the types of the recording sheets housed in the paper cassettes 31-33.

FIG. 5A shows a paper cassette selection screen 571, which is displayed when a user presses a tab for paper setting contained in a basic configuration screen (not illustrated).

If the user wishes to change the paper setting for a particular paper cassette, the user selects the paper cassette on this screen by pressing the button of the cassette shown in a paper cassette selection field 5711 (e.g. to select the first stage, the user presses the box surrounding the cassette number 1), and presses a paper-setting change button 5712. As a result, a paper setting screen 572 appears as FIG. 5B shows.

On this screen, if the user wishes to change the paper type, the user selects a desired paper type from a paper type designation field 5721, and presses an OK button 5723.

If the user whishes to change the paper size, the user presses the corresponding button in a paper size setting field 5722. As a result, another size designation screen (not illustrated) is displayed according to need, from which the user can input required information.

Such settings relating to the type and the size of the paper are stored in, for example, a table in the EEPROM 55 in association with the corresponding paper cassette.

(4) Rotation Speed Control

The following describes the rotation control for the DC motor 64 performed by the controller 50, based on a flowchart.

Figure 6:
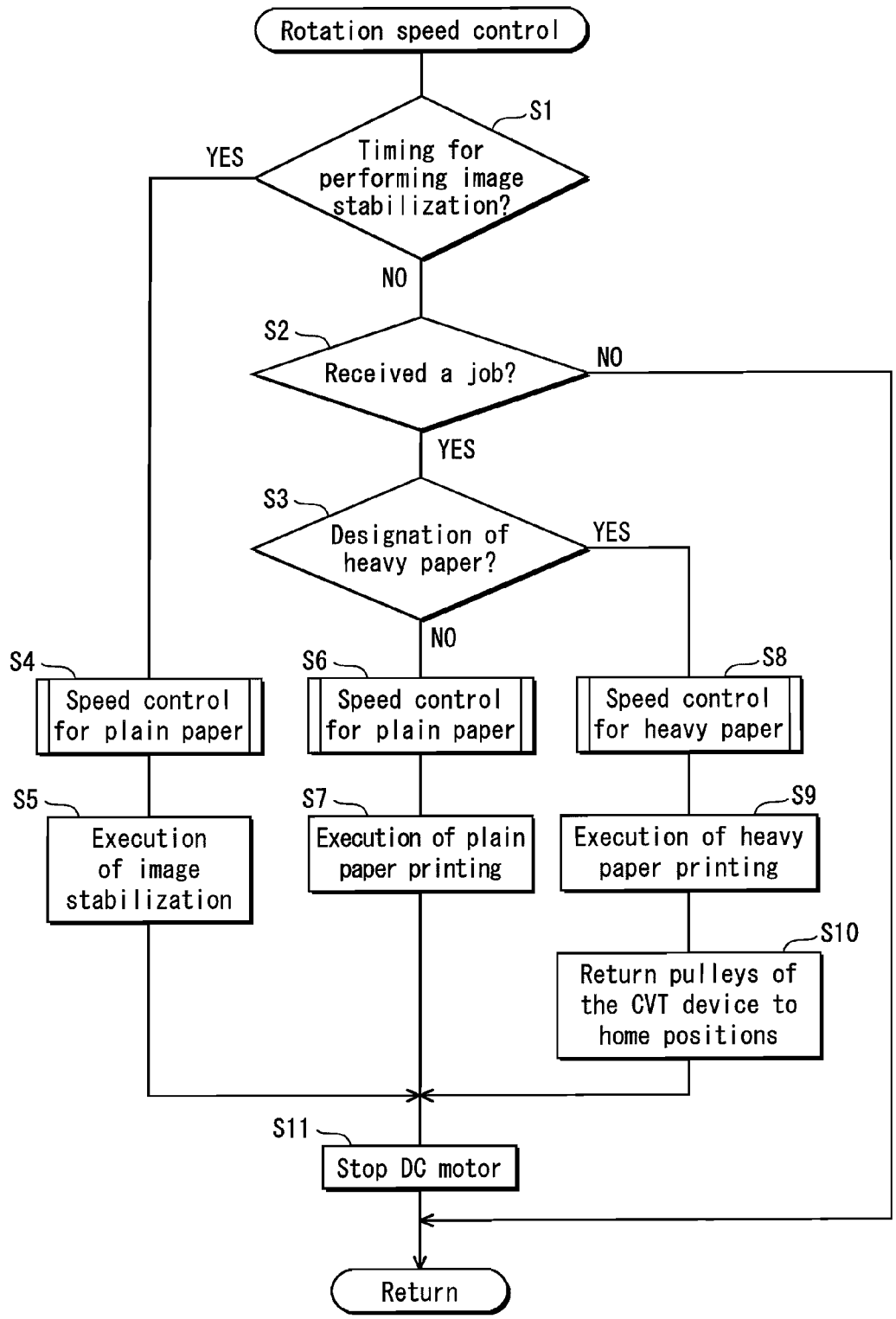
FIG. 6 is a flowchart showing a routine for controlling the system speed according to the type of a sheet to be used as a recording sheet.

FIG. 6 is a basic flowchart showing the rotation control. This control is performed as a subroutine of the main routine (not illustrated) for overall control of the photocopying machine 1.

Firstly, the controller 50 judges whether now is the timing for performing image stabilization (Step S1).

The image stabilization is procedures required for stably outputting images with fine quality, and includes image density adjustment and color deviation correction, for example. The image stabilization is performed by, for example, detecting a toner patterns formed on the conveyance belt 21 with use of a photoelectric sensor (not illustrated). The procedures are performed, for example, when the apparatus is started up, or every time when a predetermined number of images have been formed, or when a predetermined time period has elapsed. The image stabilization is well known technology, and thus not described in detail here.

In the case where the controller 50 judges that now is the timing for performing the image stabilization, it is preferable (particularly in the case of the color deviation correction) that the patterns for the image stabilization are formed at a speed equal to the system speed for actual image formation. Thus, if judged affirmatively in Step S1, the controller 50 firstly performs the speed control for sheets of plain paper (Step S4), and then performs the image stabilization (Step S5).

After performing the image stabilization, the controller 50 stops the DC motor 64, and returns to the main routine (Step S11).

Meanwhile, if judged in Step S1 that now is not the timing for performing the image stabilization and judged in Step S2 that a job (a print job or a copy job) has been received (Step S1: NO, Step S2: YES), the controller 50 judges whether thick paper is to be used next (Step S3).

Whether a job has been received or not can be judged as follows: in the case of a print job, the controller 50 judges whether it has received print job data from an external terminal device; and in the case of a copy job, the controller 50 judges whether the start key on the operation panel 57 is pressed in the copy mode.

Also, whether the paper is plain paper or thick paper can be judged as follows: in the case of a print job, it can be judged based on the paper cassette designated in the header of the received print job data; and in the case of a copy job, it can be judged based on a user's selection of a paper cassette input from the operation panel 57.

If judged negatively in Step S3 as a sheet of plain paper is used, the controller 50 performs the speed control for plain paper in the same manner as in Step S4, and then performs printing for plain paper (Step S3: NO, Step S6, Step S7).

After finishing the printing, the controller 50 stops the DC motor 64 (Step S11), and returns to the main routine.

If judged in Step S3 that a sheet of thick paper is used (Step S3: YES), the controller 50 returns to Step S8 and performs the speed control for thick paper, and then performs the printing for thick paper (Steps S8 and S9).

In the printing for thick paper, the pulley segments in the CVT device 60 are moved to change the system speed. Thus, after the printing, the controller 50 returns the pulley segments back to their respective home positions, and then stops the DC motor 64 (Steps S10 and S11) and returns to the main routine.

Figure 7:
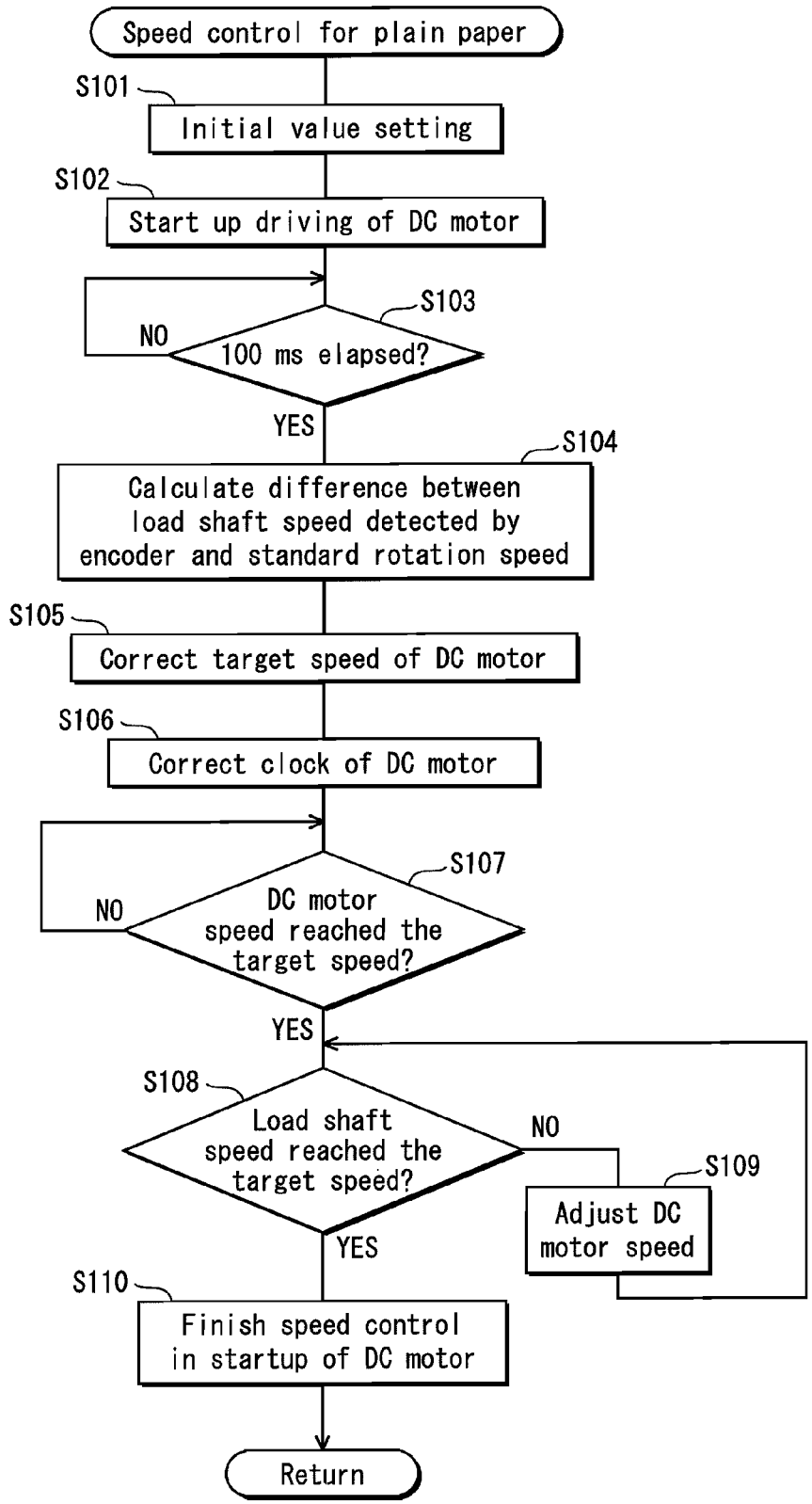
FIG. 7 is a flowchart showing a subroutine performed in Steps S4 and S6 shown in FIG. 6.

FIG. 7 is a flowchart showing a subroutine for the speed control for plain paper, performed in Steps S4 and S6 shown in FIG. 6.

Firstly, to obtain the system speed V1 for plain paper, the controller 50 reads, from the initial value table in the table storage 56, the target rotation speed of the DC motor 64 and the target rotation speed of the load shaft 621 and sets them into the RAM 53 (Step S101). Then, the controller 50 causes the CPU 51 to transmit a control signal (i.e. a motor clock) to the DC motor driver 81 (See FIG. 4) such that the DC motor 64 starts driving and achieves the target rotation speed (Step S102).

FIG. 12 shows an example of the initial value table T1 mentioned above.

In this example, the system speed is switched between two levels, namely a speed V1 for plain paper and a speed V2 for thick paper. The speed V2 is a half of the speed V1. In association with each of the paper type, the transmission ratio of the CVT device 60, a drive pulse count for defining the rotation amount of the drive shaft of the stepping motor 67 in the gap-distance adjustment mechanism 670, the initial value of the target count of the rotations of the DC motor 64, and the target rotation speed of the load shaft 621.

In Step S101, an initial rotation speed $b_1$ [rpm (revolutions per minute)] of the DC motor 64 and a target rotation speed $c_1$ of the load shaft 621 are read from the initial value table T1, and are set into the RAM 53.

According to this embodiment, on completion of a print job for thick sheet as shown in Step S10 of FIG. 6, the controller 50 stops the DC motor 64 after returning the drive pulley 61 and the driven pulley 62 (hereinafter sometimes collectively called "pulleys") back to their home positions (See Step S11 in FIG. 6) to prepare for the next print job of plain paper. Thus, when performing printing for plain paper, it is unnecessary to change the transmission ratio of the CVT device 60.

As a matter of course, there is a possibility that the pulleys are deviated from the home positions due to maintenance by a serviceman or external forces applied to the apparatus. Thus, just in case, an additional step may be inserted for judging whether the pulley segment 611 of the pulley 61 is at its home position or not with use of the home position sensor 66, and driving the stepping motor 67 to adjust the pulley to be at the home position if it is not at the home position.

The controller 50 judges whether 100 ms elapsed after the driving start of the DC motor 64 in Step S102. If judged affirmatively (Step S103: YES), the controller 50 performs the correction during the startup of the motor as shown in Steps S104 to S106.

Specifically, in the middle of the startup of the motor, from the driving start of the DC motor 64 to when the rotation speed of the DC motor 64 reaches the target speed, the target rotation speed $b_1$ of the DC motor 64, which has been set as the initial value, is corrected in view of the setting error of the transmission ratio.

More specifically, when 100 ms elapsed from the driving start of the DC motor 64, the controller 50 detects the rotation speed Rd of the load shaft 621, based on an output from the encoder 65, and calculates a difference ΔR between the rotation speed Rd and a standard rotation speed Rs (Step S104).

Here, the standard rotation speed Rs is the rotation speed of the DC motor 64 in the case the transmission ratio of the CVT device 60 is correctly set at $a_1$ (See the initial value table of FIG. 12) and measured at 100 ms after the driving start of the DC motor 64 under control for achieving the target rotation speed $b_1$ for obtaining the target system speed. The standard rotation speed Rs is beforehand calculated by a test for example, and is stored in the ROM 54.

Note that "100 ms" is only an example for determining the timing of the correction. Thus, another value may be used as long as it is during the startup of the motor. However, if the timing is too early, it is difficult to make appropriate correction because the rotation of the DC motor 64 is unstable. On the other hand, if the timing of the correction is too late, such as immediately before the end of the startup control, the correction does not have a sufficient effect. In conclusion, it is preferable that the timing of the correction is set in the range from several tens to 300 ms.

When driving the stepping motor 67 to move the pulleys to their home positions to change the transmission ratio of the CVT device to be $a_1$, it is inevitable that an error occurs because the speed change is performed by mechanical movement.

The target rotation speed $b_1$ at the startup of the DC motor 64, which is shown in the initial value table T1 (FIG. 12) is a value determined such that the system speed will be V1 for plain paper when the transmission ratio of the CVT device 60 is precisely $a_1$. Thus, if the difference ΔR between the rotation speed Rd and the standard rotation speed Rs of the load shaft 621 (i.e. Rd−Rs=ΔR) is less than 0 (i.e. ΔR<0), it means that the actual transmission ratio is less than the target transmission ratio $a_1$. Thus, the controller 50 corrects the target rotation speed of the DC motor 64 to be u % greater than $b_1$.

On the other hand, if ΔR>0, it means that the actual transmission ratio is greater than the target transmission ratio $a_1$. Thus, the controller 50 corrects the target rotation speed of the DC motor 64 to be d % less than $b_1$.

The correction amounts u and d change according to the amount of the difference ΔR. Such relation is shown in the table T2 used for correction of the target rotation speed of the motor. This table is stored in the ROM 54, and the controller 50 determines the correction amount based on the table.

FIG. 13 is an example of the table T2 used for correction of the target rotation speed of the motor. This table contains correction amounts d % and u % to be applied to the target rotation speed $a_1$. Each of the correction amounts d % and u % is calculated beforehand for the corresponding value of the proportion of the difference ΔR to the standard rotation speed Rs.

This table is created on the assumption that the error of the load shaft rotation speed Rd detected 100 ms after that rotation start with respect to the previously-calculated standard rotation speed Rs is within the range from −1.5% to +1.5%. However, the range of the error can change if a different mechanism is adopted for, for example, the gap-distance adjustment mechanism 670 of the pulley of the CVT device 60. Thus, an appropriate table is to be prepared according to the error range.

In Step S105 of FIG. 7, the controller 50 corrects the initial value $b_1$ of the target rotation speed of the DC motor 64 with reference to the table shown in FIG. 12, based on the difference ΔR between the standard rotation speed Rs of the load shaft 621 and the detected rotation speed Rd calculated in Step S104. The motor clock adjusted to realize the corrected rotation speed is transmitted from the CPU 51 to the DC motor driver 81 (Step S106).

Then, the controller 50 monitors the rotation speed of the DC motor 64 by using the encoder 642. When the rotation speed reaches the target rotation speed after the correction (Step S107: YES), the controller 50 detects the rotation speed of the load shaft 621 by using the encoder 65, and performs feedback control until the detected speed reaches the target rotation speed $c_1$ (See the initial value table T1 shown in FIG. 12) (Step S108: NO, Step S109).

Specifically, the controller 50 compares the speed cd detected by the encoder 65 with the target speed $c_1$. If they are different, the controller 50 calculates the difference Δc, and adjusts the frequency of the motor clock, which is to be transmitted to the DC motor driver 81, according to the amount of the difference Δc and whether it is a positive value or a negative value. This fine adjustment may be performed by multiplying the difference Δc by a predetermined feedback gain. Alternatively, to realize more precise adjustment, a table may be created for associating the amounts of the difference Δc and the correcting amount of the motor clock counts, respectively. If this is the case, the controller 50 adjusts the motor clock with reference to the table.

When the rotation speed of the load shaft 621 reaches the target rotation speed $c_1$, the controller 50 stops the speed control for the startup of the DC motor 64 (Step S110), and returns to the main routine.

Figure 9:
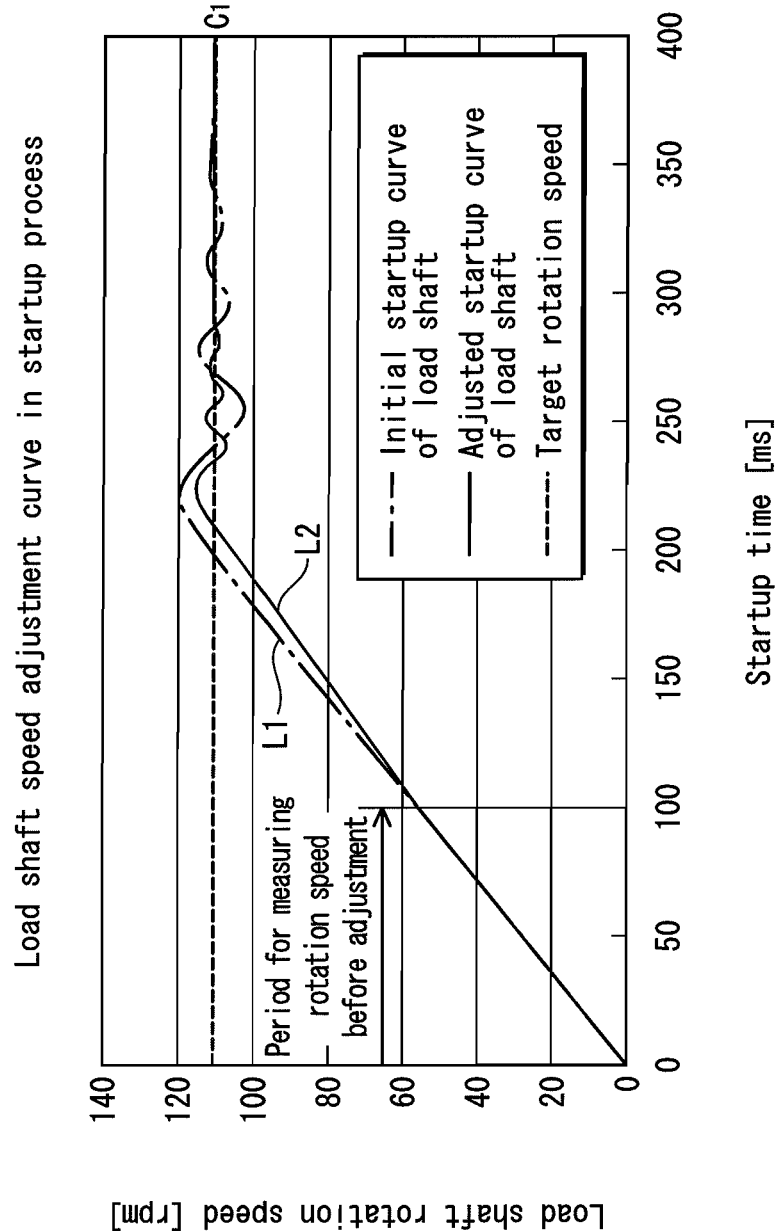
FIG. 9 is a graph for explaining an advantage of correcting a control signal during the initial startup of a DC motor, and shows the relationship between the startup time and the load shaft rotation speed.

FIG. 9 is a graph showing the change of the load shaft rotation speed, due to the correction during the startup of the motor, illustrated in FIG. 7. The horizontal axis indicates the elapsed time [ms] from the drive start, and the vertical axis indicates the load shaft rotation speed [rpm]. It is assumed in this embodiment that the target rotation speed $c_1$ of the load shaft 621 for achieving the system speed V1 for plain paper is 110 rpm.

As FIG. 9 shows, the DC motor 64 is initially driven to target the rotation speed $b_1$ according to the initial setting. Then, after 100 ms, the target speed is corrected based on the difference from the standard rotation speed Rs.

This drawing shows an example where the transmission ratio of the CVT device 60 exceeds the target value $a_1$, and the rotation speed at 100 ms from the startup is higher than the standard rotation speed.

Thus, if no correction is made, the rotation speed far exceeds the target rotation speed $c_1$ as the dashed dotted line L1 shows, and is then subjected to the feedback control. This means that it takes a long time to achieve the target rotation speed $c_1$.

On the other hand, according to the embodiment, the target rotation speed $b_1$ of the motor is corrected according to the difference from the standard rotation speed Rs at 100 ms from the start of the driving. Thus the rotation speed changes as the solid line L2 shows, and the feedback control is started from a point closer to the target rotation speed c1 of the load shaft than the case of the dashed dotted line L1. As a result, it is possible to achieve the target rotation speed $c_1$ in a short time, and keep the speed stable.

Figure 10:
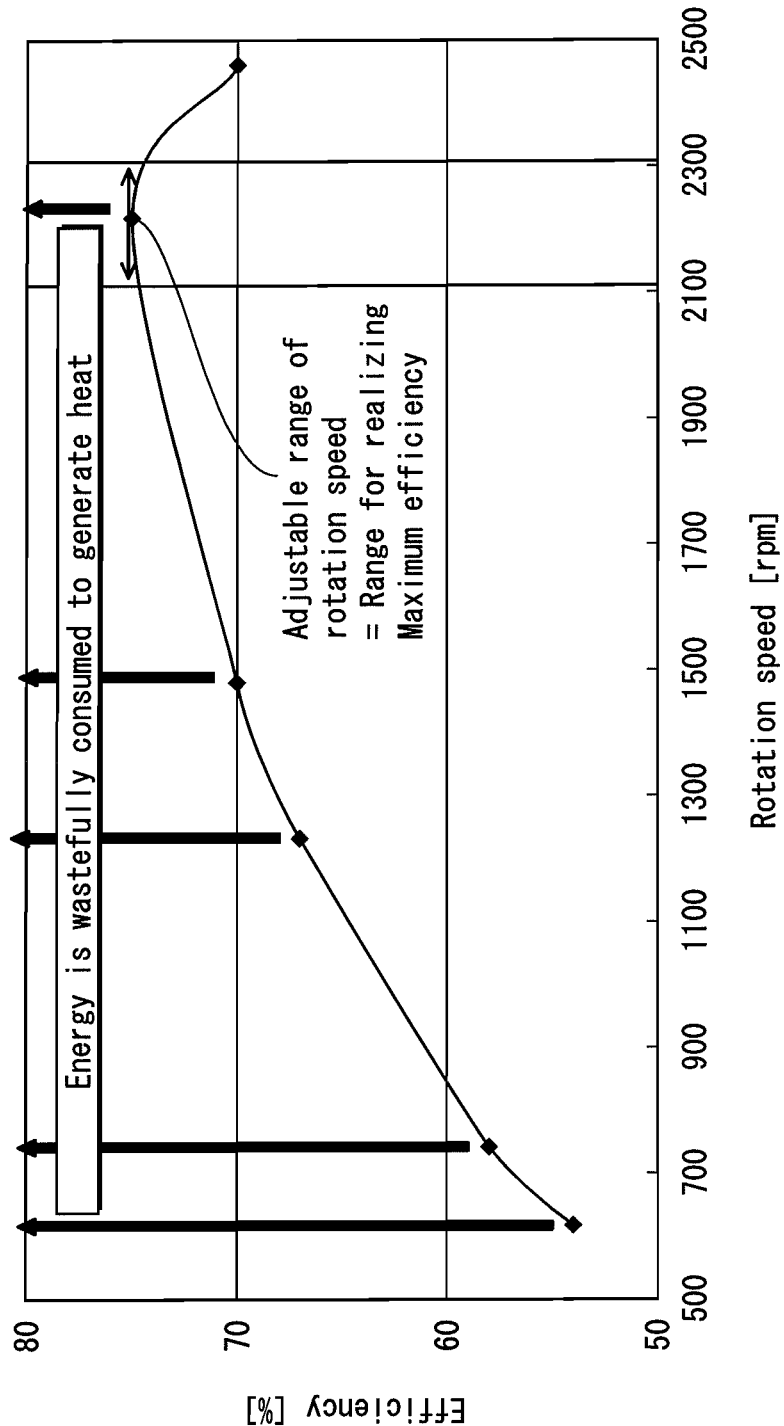
FIG. 10 shows the energy conversion efficiency and the rotation speed of the DC motor.

It is known that DC motors are generally characterized by that the energy conversion ratio changes according to the rotation speed. FIG. 10 shows the energy conversion efficiency and the rotation speed of the DC motor 64. The horizontal axis shows the rotation speed [rpm] and the vertical axis shows the energy conversion efficiency [%].

As FIG. 10 shows, the energy conversion efficiency reaches a peak when the rotation speed is 2200 [rpm], and the efficiency is lower at any other rotation speed. As the energy conversion efficiency decreases, an increased amount out of the energy to contribute the driving of the DC motor 64 is wastefully consumed to generate heat. This is undesirable in terms of energy saving.

According to the embodiment, the transmission ratio $a_1$ under the condition that the rotation speed of the load shaft 621 is controlled to be the target rotation speed $c_1$ is beforehand determined such that the final rotation speed of the DC motor 64 will achieve a conversion efficiency greater than a predetermined value when the transmission ratio of the CVT device 60 is changed to $a_1$, even if an error of the transmission ratio occurs.

As a result, even when changing the rotation speed of the load shaft 621, it is possible to control the rotation speed of the DC motor 64 within the range in which the energy conversion ratio of the DC motor 64 is greater than the predetermined value. This realizes a great power saving effect.

The example shown in FIG. 10 assumes that the transmission ratio $a_1$ is determined such that the rotation speed of the DC motor 64 is adjustable within the range from approximately 98% (2100 to 2300 [rpm]: Conversion efficiency of approx. 73.5%) of the peak of the conversion efficiency (Conversion efficiency of approx. 75%: approx. 2200 [rpm]).

Note that even if the conversion efficiency at the controlled rotation speed of the DC motor 64 is not as high as 98% (e.g. greater than 90%), it is possible to realizes a sufficient power saving effect.

Figure 11:
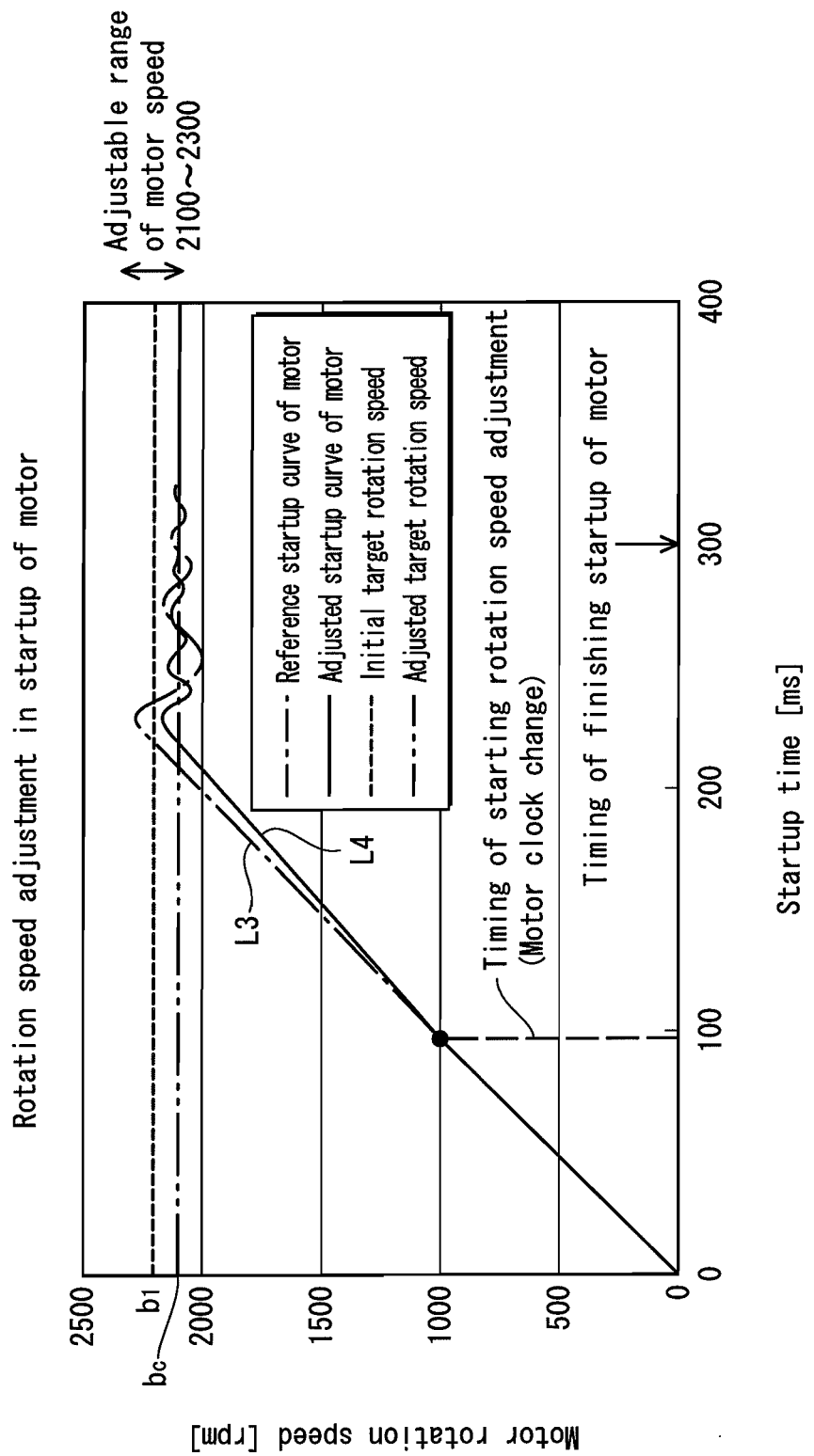
FIG. 11 is a graph for explaining an advantage of correcting a drive signal during the initial startup of the DC motor, and shows the relationship between the startup time and the rotation speed of the DC motor.

FIG. 11 shows the relationship between the elapsed time [ms] from the startup of the DC motor 64 and the change in the rotation speed of the DC motor 64.

The DC motor 64 starts up targeting the initial rotation speed $b_1$. After 100 ms, the target rotation speed b1 is corrected by the correction described above. Thus, the rotation speed changes as the line L4 shows. The corrected target rotation speed (hereinafter denoted as $b_1'$) should be almost the same as the rotation speed (hereinafter denoted as bc) to be realized by the feedback control of the load shaft 621. Thus, the adjustment by the feedback control does not take a long time.

Here, if the target transmission ratio $a_1$ of the CVT device 60 is set such that the initial target rotation speed $b_1$ will be an intermediate value (e.g. 2200 [rpm]) of the optimum range (2100-2300 [rpm]) of the rotation speed for realizing the desired conversion efficiency described above, it is possible to keep the corrected target rotation speed $b_1'$ and the final rotation speed bc after the feedback control within the optimum range as well, even if the actual transmission ratio has an error in the range of plus or minus 1.5%. This realizes efficient driving of the DC motor 64 and reduces wasteful energy consumption.

Figure 8:
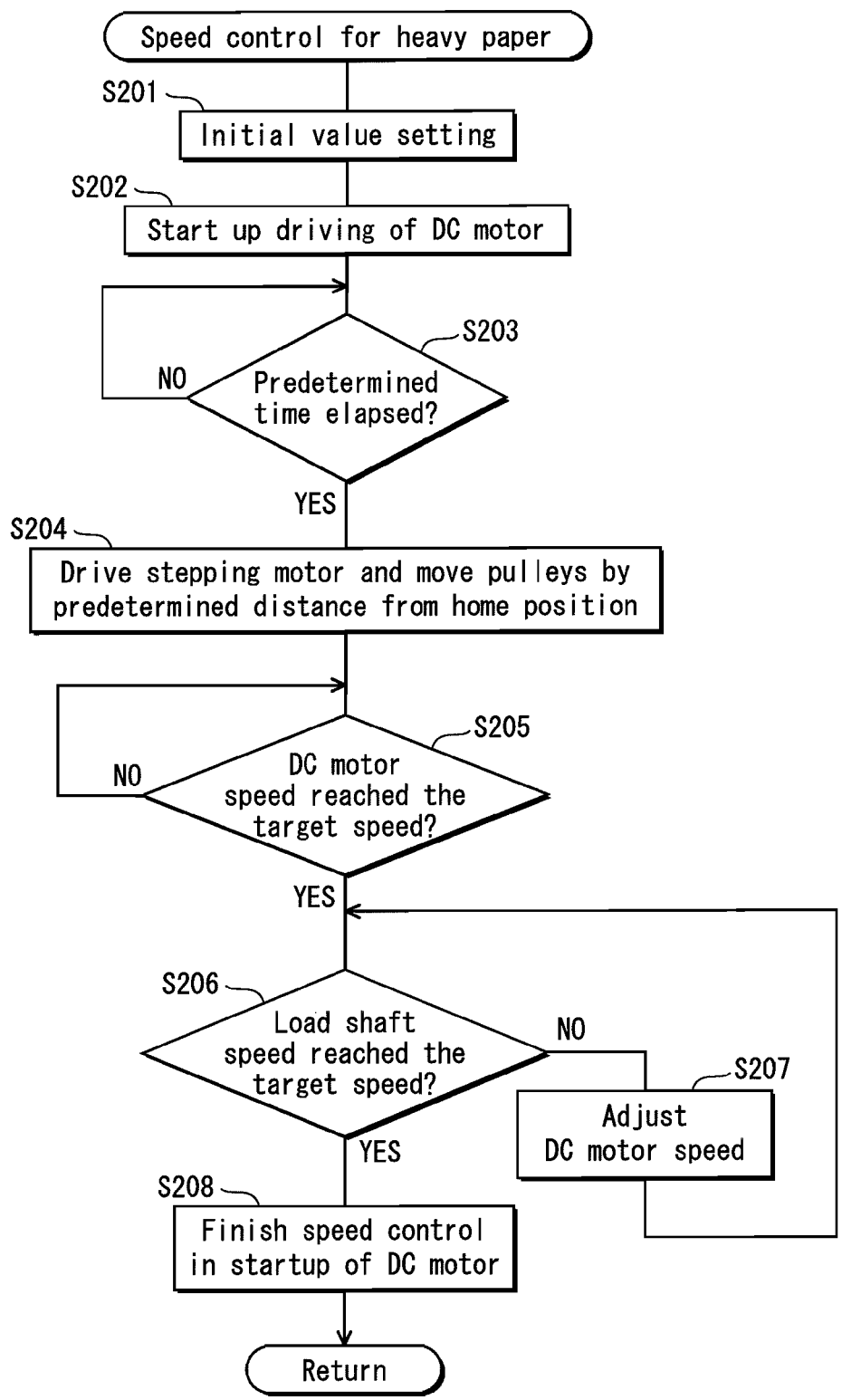
FIG. 8 is a flowchart showing a subroutine performed in Step S8 shown in FIG. 6

FIG. 8 is a flowchart showing the speed control for thick paper.

As the flowchart shows, the controller 50 firstly reads the target rotation speed $b_2$ of the DC motor 64 and the target rotation speed $c_1/2$ of the load shaft from the initial value table T1, and writes them into the RAM 53 (Step S201). Here, the target rotation speed $b_2$ is the speed for realizing the system speed V2 for thick paper.

Then, the controller 50 starts driving the DC motor 64, targeting the target rotation speed $b_2$ (Step S202).

After waiting for a predetermined time (e.g. 10 ms) from the driving start (Step S203), the controller 50 drives the stepping motor 67 and moves the pulleys from their home positions by a predetermined distance, and thereby changes the transmission ratio of the CVT device 60 to $a_1/2$ (Step S204).

Specifically, the CPU 51 of the controller 50 reads a driving pulse k from the initial value table T1, and sends a control signal to the stepping motor driver 82 to cause the stepping motor 67 to rotate according to the pulse. Here, the driving pulse k stored in the initial table T1 corresponds to the rotation count of the stepping motor 67 required for moving the pulleys from the positions by the distance calculated beforehand and realizing the transmission ratio $a_1/2$.

Then, when it is judged based on the detection by the encoder 642 of the DC motor 64 that the rotation speed of the DC motor 64 reaches the initial rotation speed $b_2$ determined in Step S201 (Step S205: YES), the controller 50 next judges whether the rotation speed of the load shaft 621 is the target rotation speed $c_1/2$, based on the output from the encoder 65, and adjusts the rotation of the DC motor 64 for the feedback control (Step S206: NO, Step S207).

In Step S206, when the rotation speed of the load shaft 621 reaches the target rotation speed $c_1/2$, the controller finishes the control for the startup of the DC motor 64, and returns to the flowchart in FIG. 6.

In this way, the rotation speed of the load shaft is regulated precisely to be $c_1/2$, and the system speed is accurately switched to the speed for thick paper.

Here, the ratio between the system speed V1 for plain paper and the system speed V2 for thick paper is 2:1 as described above and the transmission ratio of the CVT device 60 is ½. Thus, after the control, the final rotation speed of the DC motor 64 for the plain paper and that for the thick paper are almost the same or very close to each other, and the rotation speed of the DC motor 64 in the case of using thick paper also achieves the optimum range of the conversion efficiency.

As described above, according to the embodiment, the CVT device 60 changes the system speed by combining the changing of the transmission ratio of the CVT device 60 and the rotation control of the DC motor 64. The transmission ratio is quickly changed without feedback control. The rotation control includes feedback control of the rotation speed of the DC motor 64, which is performed based on the detected rotation speed of the load shaft 621 to correct the setting error of the transmission ratio. Thus, it is possible to quickly and accurately change the system speed while keeping the quietness of the CVT device 60.

An image formatting apparatus pertaining to the present invention is described above based on the embodiment. However, as a matter of course, the present invention is not limited to the embodiment. The following modifications are possible.

(1) In the embodiment above, the screw mechanism utilizing the stepping motor as the driving source is suggested to realize the distance adjustment for the pulleys of the CVT device 60. However, the gap-distance adjustment mechanism is not limited to the screw mechanism.

Instead of the stepping motor, a servomotor may be used as the driving source. Also, instead of the screw mechanism, an eccentric cam mechanism may be used for changing the pulley distance.

In the case where the system speed is switched between only two speeds, a solenoid actuator may be used for switching the pulley distance between two distances.

Figure 14A:
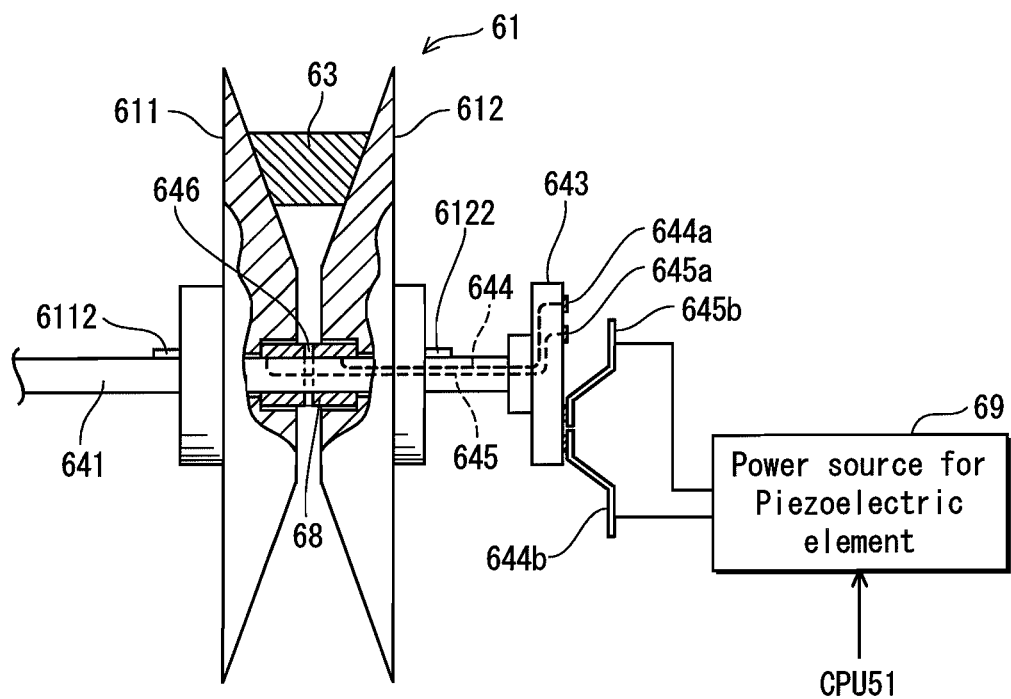
FIGS. 14A and 14B show an example structure of the CVT device in the case of using a piezoelectric element.

Furthermore, piezoelectric elements may be used as the driving sources of the gap-distance adjustment mechanism. FIG. 14A is a partially cutaway view showing an example of such a case.

Between pulley segments 611 and 612, a piezoelectric element 68 having a cylindrical shape is inserted along a driving shaft 641. The drive shaft 641 is made of a hollow pipe. A lead wire connected to the electrode of the piezoelectric element passes through the hollow, and reaches the end surface of the flange 643.

Figure 14B:
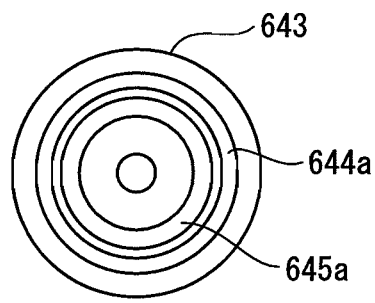

Ring-shaped metal electrodes 644a and 645a are concentrically provided on the end surface of the flange 643 as FIG. 14B shows. Lead wires 644 and 645 are connected to the ring-shaped electrodes 644a and 645a, respectively.

The ring-shaped electrodes 644a and 645a are in contact with the tips of elastic metal pieces 644b and 645b respectively, and a predetermined voltage is supplied by a piezoelectric element power source 69 to the piezoelectric element 68 via the elastic metal pieces 644b and 645b, the ring-shaped electrodes 644a and 645a, and the lead wires 644 and 645.

The piezoelectric element 68 is of a layered type expanding and contracting in the direction of the axis of the pulley by application of a voltage. The piezoelectric element 68 is fixed to the driving shaft 641 with a pin 646 provided in the middle of the axis of the pulley. The thickness of the piezoelectric element 68 changes in both right and left directions by the same length, according to the applied voltage. Also, the end surfaces of the piezoelectric element 68 in the axis direction are bonded to the surfaces of the pulley segments 611 and 612 respectively facing thereto, with an adhesive agent for example. The pulley segments 611 moves away from and close to each other as the piezoelectric element 68 expands and contracts. A similar structure is applicable to the driven pulley 62 even though the level and polarity of the voltage to be applied to the piezoelectric element 68 is different from the case of the drive pulley 61.

The ratio between the level of the voltage applied to the piezoelectric element 68 and the amount of the change in the thickness thereof is 1:1. Thus, the voltages applied for changing the transmission ration of the CVT device 60 to $a_1$ (for plain paper) and $a_1/2$ (for thick paper) may be beforehand calculated and stored in the initial value table T1, and the CPU 51 may refer to the initial value table T1 and instruct the piezoelectric element power source 69 to apply the calculated voltages to the piezoelectric element 68.

Note that the piezoelectric element power source 69 may be a digitally-controlled power source device that controls the output voltage by PWM control or PAM control for example. Alternatively, the power source 69 may have a simpler structure. For example, a plurality of resistors may be connected in series to divide the applied voltage, and a connection point may be selected with a switch to obtain a desired voltage value.

As described above, it is possible to simplify the structure of the gap-distance adjustment mechanism by using, as a driving source of the gap-distance adjustment mechanism, a piezoelectric element, which expands and contracts in the direction of the axis of the pulley according to the applied voltage. At the same time, it is possible to easily control the transmission ratio of the variable speed transmission unit by simply changing the level of the voltage to be applied to the piezoelectric element.

(2) According to the embodiment above, the correction of the motor clock during the startup of the motor is performed only in the speed control for plain paper (See Steps S103-S106 in FIG. 7 and FIG. 9).

However, even in the case of the speed control for thick paper shown in FIG. 8, if the moving of the pulleys of the CVT device 60 finishes in the startup process of the DC motor 64 (e.g. in the case where the startup of the DC motor 64 requires 300 ms and the moving of the pulleys finishes 200 ms after the beginning of the startup of the DC motor 64), it is possible to correct the motor clock for controlling the DC motor 64 based on the difference ΔR between the detected rotation speed Rd of the load shaft 621 and the standard rotation speed Rs, after the completion of the moving of the pulleys.

If this is the case, a table for correcting the target rotation speed of the motor, which is similar to the table shown in FIG. 13, may be prepared for correction of the rotation speed of the load shaft 621 after 200 ms from the driving start of the DC motor 64, and the motor clock may be corrected based on this table.

(3) According to the embodiment described above, the system speed is switched between two speeds, namely the speed for plain paper and the speed for thick paper. However, it is possible to more precisely changing the system speed according to the type of the recording sheet to be used.

With this structure, it is possible to obtain an appropriate rotation speed according to the type of the sheet on which the image formation is to be performed.

Here, as described above, the CVT device is capable of realizing stepless transmission speed change. Furthermore, it is possible to change the setting of the system speed by changing the control program. Thus, the CVT device has broad versatility as a variable speed driving mechanism. Therefore, it is possible to produce a large number of the CVT devices of the same type and adopt them in various apparatuses. This reduces the price per CVT device, and accordingly reduces the manufacturing cost of the image forming apparatuses.

(4) According to the embodiment described above, the transmission ratio is changed to $a_1/2$ for thick paper by the home position sensor 66 detecting that the pulley segment 611a of the drive pulley 61 of the CVT device 60 is at the home position, and the CPU 51 providing the number of the driving pulses to the stepping motor 67 to regulate the moving amounts of the pulley segments. However, an individual position sensor may be provided for detecting the position of some of the pulley segments when the transmission ratio is $a_1/2$ (i.e. it is unnecessary that the position of the pulley segment 611a is detected, because the pulley segments according to the embodiment above move in conjunction with each other). With this structure, it is possible to obtain a desired transmission ratio by stopping the moving when the individual position sensor detects the corresponding pulley segment.

(5) The rotation speed control adopted in the photocopying machine pertaining to the embodiment described above may be realized as a rotation speed control method or a program for causing a computer to execute the method. Also, the program may be recorded on varieties of recording media from which data can be read with use of a computer. Such recording media include: a magnetic tape, a magnetic disc such as a flexible disc, an optical disc such as a DVD, a CD-ROM, a CD-R, an MO, and a PD, and a flash memory type recording medium such as a Smart Media (registered trademark) and a COMPACTFLASH (registered trademark). The program may be produced and transferred, in the form of the aforementioned recording media. Alternatively, the program may be transmitted and supplied, in the form of the program itself, via a variety of wired/wireless network including the Internet, a broadcast, an electric communication circuit, and satellite communication.

(6) As an example of the image forming apparatus pertaining to the present invention, a full-color photocopying machine to which the present invention is applied is described above. However, the present invention is applicable to any photocopying machine no matter whether the machine is a color photocopying machine or a monochrome photocopying machine. Furthermore, in addition to photocopying machines, the present invention is generally applicable to rotation speed control in image forming apparatuses having a rotative driving unit, such as printers and facsimile machines. Here, some of printers are not provided with the operation panel 57.

In the case of such printers, they may receive user's instructions, including the type of the sheet on which the image formation is to be performed, from an external device such as a PC (Personal Computer).

If this is the case, job data including such an instruction is received by the communication I/F 52 in the printer, via the network. Thus, in the image forming part, the communication I/F in this case is equivalent to the operation panel 57.

As described above, it is unnecessary that the operation panel 57 is provided in the image forming apparatus. In other words, it is only necessary that the image forming apparatus is provided with a receiver for receiving user's instructions of job data including such instructions.

The present invention is suitable for realizing an image forming apparatus that is quiet and capable of accurately and quickly changing the system speed.

REFERENCE SIGNS LIST 1 photocopying machine
20 belt conveyer
30 paper feeder
40 fixing device
50 controller
56 table storage
57 operation panel
60 CVT device
61 drive pulley
62 driven pulley
63 V-shaped belt
64 DC motor
65, 642 encoders
66 home position sensor
67 stepping motor
68 piezoelectric element
69 piezoelectric element power source
71, 72, 74, 75. 691, 692 timing pulleys
73, 75, 693 timing belts
81 DC motor driver
82 stepping motor driver

The invention claimed is:

1. An image forming apparatus comprising:
a driver unit utilizing a motor as a driving source and operable to rotate a load shaft connected with at least one of a sheet conveyance roller and a rotative image carrier; and
a controller operable to control the driver unit to regulate a rotation speed of the load shaft, wherein
the driver unit includes a variable speed transmission unit for transmitting a driving force and changing a transmission ratio between the motor and the load shaft,
the variable speed transmission unit includes:
a pair of pulleys each having a groove in a circumferential surface thereof and each divided into a pair of pulley segments in the middle of an axis thereof;

a V-shaped belt suspended between the grooves of the pair of pulleys; and a distance changer unit changing, for each pair of pulley segments, a distance between the pair of pulley segments, to change the transmission ratio, and the controller is configured to perform:

a first control for controlling, after the motor starts to rotate targeting a target rotation speed, the variable speed transmission unit to cause the distance changer unit to change the transmission ratio to a predetermined ratio; and a second control for detecting the rotation speed of the load shaft after completion of the first control, and changing the rotation speed of the motor by feedback control, to change the rotation speed of the load shaft to a target rotation speed.

2. The image forming apparatus of claim 1, wherein the image forming apparatus is capable of performing image formation on a plurality of types of sheet, and the image forming apparatus further comprising:

a receiver operable to receive designation of a paper type of a sheet on which image formation is to be performed, wherein the target transmission ratio and the target rotation speed are preset for each one of the types of sheet; and the controller performs the first control and the second control based on the preset target transmission ratio and the preset target rotation speed preset according to the paper designated type of sheet.

3. The image forming apparatus of claim 2, wherein the plurality of types of sheet comprises a plain paper type of sheet, and the controller performs a third control for causing the distance changer unit to return each of the pair of pulley segments to a position to achieve a transmission ratio corresponding to the plain paper type of sheet upon completion of the image formation on a sheet other than the plain paper type of sheet.

4. The image forming apparatus of claim 1, wherein the transmission ratio is determined such that the rotation speed of the motor is within a range for achieving an energy conversion efficiency no less than a predetermined value.

5. The image forming apparatus of claim 1, wherein the controller initiates a startup process of the motor by using a first driving signal, detects the rotation speed of the load shaft in the startup process after a predetermined time from the beginning of the startup process, compares the detected rotation speed with a preset standard rotation speed for achieving the target rotation speed of the load shaft, and performs a fourth control if the rotation speed is different from the preset standard rotation speed, the fourth control for generating a second driving signal by correcting the first driving signal, and causing the motor to continue the startup process based on the second driving signal.

6. The image forming apparatus of claim 1, wherein the speed changer unit includes a position detector for detecting a home position of the pulley segment, and the controller performs the first control by causing the distance changer unit to vary a relative distance of the pulley segments by a given amount.

7. The image forming apparatus of claim 1, wherein the speed changer unit includes a position detector for detecting positions of the pulley segments for achieving a first transmission ratio and a second transmission ratio, and the controller performs the first control by controlling the distance changer unit based on an output from the position detector to achieve either the first transmission ratio or the second transmission ratio.

8. The image forming apparatus of claim 1, wherein the distance changer unit utilizes piezoelectric elements as driving sources, the piezoelectric element expanding a contracting in the direction of the axis of each pulley according to a voltage applied thereto.

9. The image forming apparatus of claim 1, wherein the pulley segments for each pulley move in opposite directions.

* * * * *